W. G. HOUSKEEPER.
COMBINED METAL AND GLASS STRUCTURE AND METHOD OF FORMING SAME.
APPLICATION FILED JAN. 4, 1918.
1,293,441.
Patented Feb. 4, 1919.
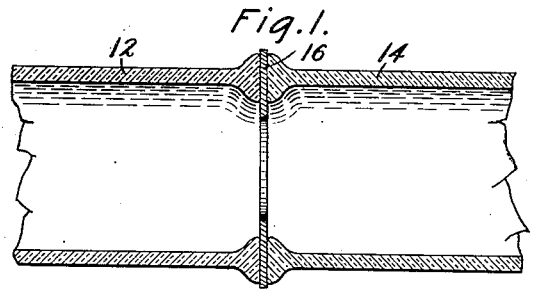
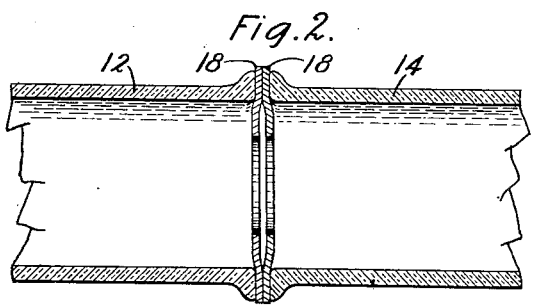
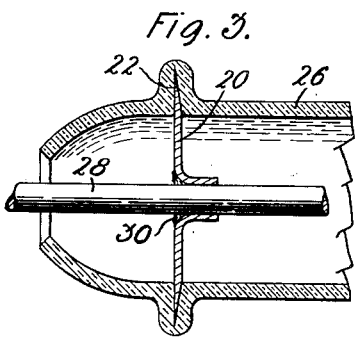
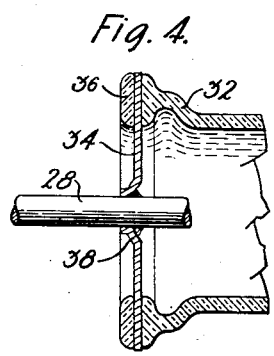
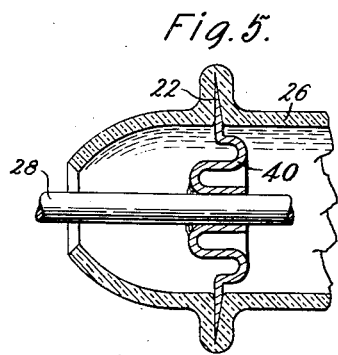
Inventor:
William G. Houskeeper
by J. G. Roberts Att'y

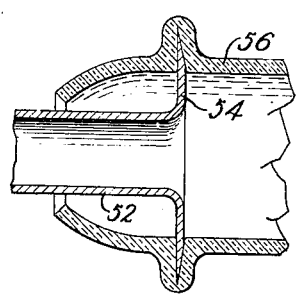
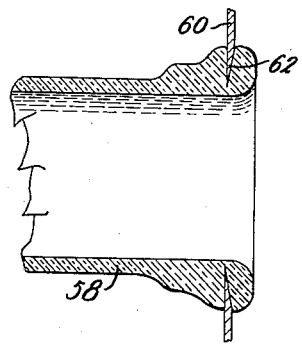
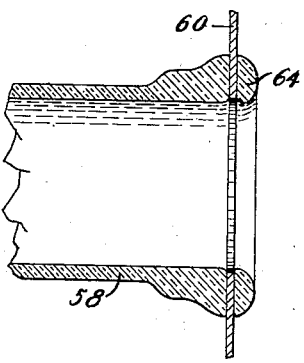
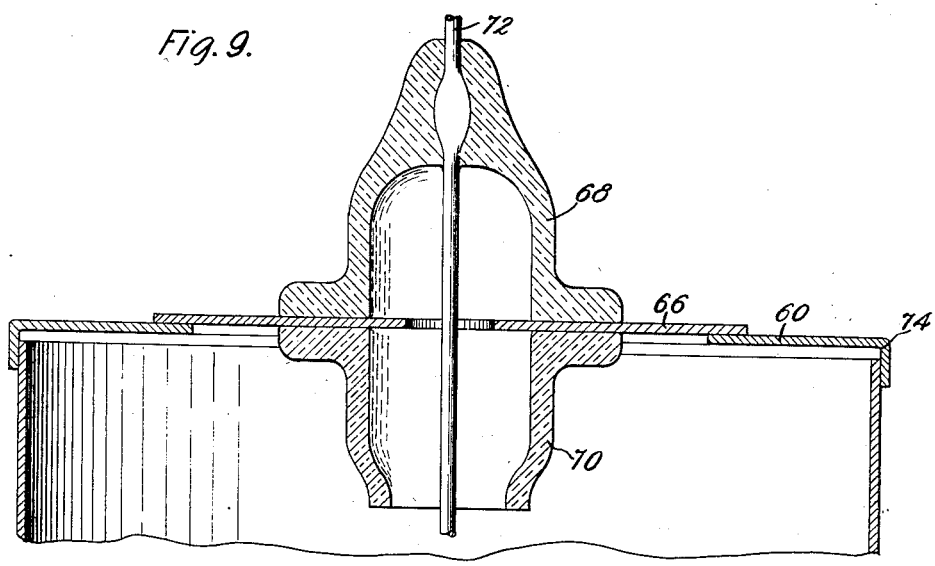
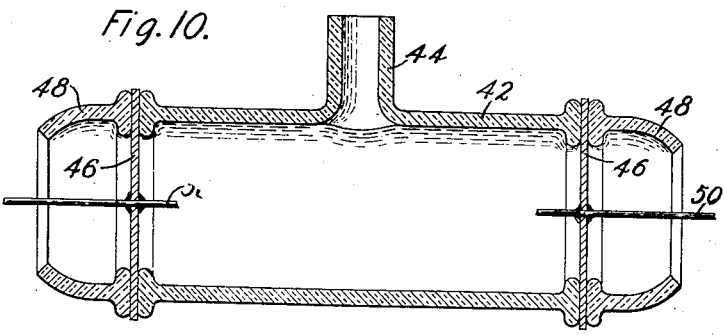

UNITED STATES PATENT OFFICE.

WILLIAM G. HOUSKEEPER, OF PHILADELPHIA, PENNSYLVANIA, ASSIGNOR TO WESTERN ELECTRIC COMPANY, INCORPORATED, OF NEW YORK, N. Y., A CORPORATION OF NEW YORK.

COMBINED METAL AND GLASS STRUCTURE AND METHOD OF FORMING SAME.

1,293,441.   Specification of Letters Patent.   Patented Feb. 4, 1919.

Application filed January 4, 1918. Serial No. 210,396.

*To all whom it may concern:*

Be it known that I, WILLIAM G. HOUSKEEPER, a citizen of the United States, residing at Philadelphia, in the county of Philadelphia, State of Pennsylvania, have invented certain new and useful Improvements in Combined Metal and Glass Structures and Methods of Forming Same, of which the following is a full, clear, concise, and exact description.

This invention relates to structures which, though required to be gas-tight, comprise a glass element and a second element connected thereto but of such character that it cannot readily be directly joined to the glass of the first element to form a reliable hermetic seal.

For example, in the assembling of tubing for connecting a vacuum pump with a vessel to be exhausted, it frequently becomes desirable to form an air-tight union between pump tubing of hard glass and a tube of softer glass connected to or forming a part of the vessel to be exhausted and whose thermal coefficient of expansion differs considerably from that of the pump tubing. Since one of the tubes will contract more than the other upon cooling, it is difficult to weld them directly together so as to form a gas-tight joint.

Again, although in view of the expense of platinum leading-in conductors for vacuum tubes and the like, it is desirable to replace such conductors with conductors of cheaper metal, such as copper, it is difficult, in view of the different coefficients of expansion of copper and glass, to hermetically seal a copper conductor into the wall of the glass container, especially if the conductor is of considerable diameter.

It is therefore an object of this invention to provide for hermetically uniting two members of different coefficients of expansion, one or both of which members are of glass. This is accomplished in the present case by welding the glass to a sheet metal member and thus forming a combined glass and metal structure to the metal element of which the other glass or metal member may be hermetically sealed.

In the accompanying drawings, Figure 1 illustrates the invention as applied to a joint between two glass tubes; Fig. 2 shows a modification of Fig. 1; Figs. 3, 4 and 5 illustrate different modifications of the invention as applied to sealing a conductor into a glass container; Fig. 6 illustrates the invention as embodied in a joint between a glass tube and a metal tube; Figs. 7 and 8 illustrate modifications in which a glass tube is welded to the edge of an opening in a sheet metal member; Fig. 9 shows a glass member hermetically joined to a metal container; and Fig. 10 illustrates the application of the invention to a vacuum tube.

In the arrangement shown in Fig. 1, the two glass tubes 12 and 14 are welded to the opposite sides of an annular disk 16 of thin sheet copper or other metal. Although copper has a higher thermal coefficient of expansion than glass, and the disk 16, therefore, in cooling from the welding temperature would normally contract to a greater extent than the glass tubes, the disk, by reason of its thinness and the low elastic limit of the material of which it is formed, is sufficiently stretched by the force of adhesion between the copper and glass to maintain the contacting surfaces of the copper and glass in the same relative positions at normal temperature as at the welding temperature. It is, therefore, possible by selecting a disk of proper dimensions and material to unite glass tubes of different coefficients of expansion to opposite sides of the disk. Although the elasticity of the glass tubes is insufficient to permit the formation of a permanent direct weld between them, the interposed sheet metal accommodates itself to both of the masses of glass and adheres permanently to each. In forming such a joint, it is preferable that both glass tubes be welded to the disk simultaneously in order that the strains in the disk may be at all times as evenly distributed as possible.

Such a construction is particularly adapted for use in connecting a vacuum pump or the like to a container to be exhausted when the glass of the vacuum pump tubing is of a character substantially different from that of the container.

Although as a rule the disk 16 will preferably be of copper, other metals such as iron, brass, etc., may be used. The most advantageous thickness of the disk 16 will depend upon its diameter, the metal of which it is formed, the kind of glass in the tubes 12 and 14, and the diameter and thickness of each tube.

In the modification shown in Fig. 2, the intermediate sheet metal member comprises two disks 18, one disk being welded to each tube 12 and 14 and the two disks being secured together as by soldering; this permits the ready separation of the two tubes for reunion with each other or with other tubes.

As is apparent, the disks in either of the above forms may be used as terminals for external conductors.

The arrangement illustrated in Fig. 3 comprises a sheet metal disk 20 which has its outer edge formed into a gradually tapering knife edge 22, around which is welded the glass wall of the container 26. Although the metal and glass contract to a different extent in cooling from the welding temperature, the edge of the disk is so thin that the slight strains set up transversely of the disk are not sufficient to overcome the adhesion between the sides of the disk and the glass. Since the main portion of the disk may be of relatively considerable thickness and therefore stiffness, it may serve as the support of a leading-in conductor of substantial cross section, and the conductor 28, though of such a character as not to be readily sealed directly into the glass walls of the container, may be introduced into the container through the disk 20 to which it is hermetically sealed by means of silver solder or the like 30.

Fig. 4 illustrates a modification of the arrangement shown in Fig. 3 in which the glass of the container 32 does not extend over the edge of the disk 34, as the latter is not reduced in thickness; but in order that the metal disk shall be similarly tensioned on both sides a ring of glass 36 is welded on to one side of the disk at the same time that the member 32 is welded to the other side. The disk 34 may be slightly dished as at 38 to permit it to adjust itself under varying temperatures. The disk shown in Fig. 3 may be similarly dished Fig. 5 illustrates a modification of such an arrangement in which the disk is formed into circumferential corrugations 40 to permit its expansion and contraction independently of the container 26. Such an arrangement also permits a slight longitudinal adjustment of the conductor 28.

Fig. 10 illustrates the employment of an arrangement similar to those illustrated in Figs. 3, 4 and 5, in connection with a vacuum tube. A glass cylinder 42, is provided with a nipple 44 for connection to an exhaust pump or the like, and has a disk 46 welded to each end thereof, an annular mass of glass 48 being welded to the outer side of each disk to balance the strains therein. A conductor 50 passes through and is soldered to each disk.

In Fig. 6 the end of the metal tube 52 is provided with a flange 54 having its outer edge tapered to a knife edge to which the glass tube 56 is welded as described in connection with Fig. 3; the flange may also be secured to the glass, as shown in Fig. 4 or Fig. 5.

The modifications illustrated in Figs. 7 and 8 comprise a glass tube 58 having its end welded to the inner periphery of an annular disk 60; the disk edge may be tapered to a knife edge 62, as shown in Fig. 7, with the glass welded around it, or, the glass tube end may be welded to one side of the disk and a separate ring of glass 64 welded on the other side, as in Fig. 8. These arrangements find application where it is desirable to connect a glass tube to the end of a cylinder of larger diameter.

In the arrangement shown in Fig. 9 the annular metal disk 66 has masses of glass 68 and 70 welded to the respective sides thereof, but not extended to the outer periphery of the disk. A copper wire or other conductor 72 is sealed in the outer end of the mass of glass 68, and passes through the opening at the center of the disk and out through the outer end of the mass of glass 70.

In the figure the outer edge of the disk 66 is soldered or otherwise hermetically united to the top of a metal container 74, and by this means an insulated conductor is brought out of a metal gas-tight chamber. This embodiment of the invention is useful in connection with the testing of dry cells, the container 74 being the zinc electrode casing of the cell.

What is claimed is:

1. A combined metal and glass structure comprising a sheet metal member provided with a flat surface and a glass tube welded directly to said flat surface.

2. A combined metal and glass structure comprising a sheet metal member provided with a flat surface and a glass tube having one end welded directly to said flat surface in abutting relation thereto.

3. In combination with a glass tube, a metal disk of substantially the same diameter as said tube, and having its edge welded to said tube.

4. A combined metal and glass structure comprising a sheet metal disk provided with a sharpened edge and glass welded to the sides of said disk at said sharpened edge.

5. A combined metal and glass structure comprising a sheet metal disk provided with a sharpened edge and glass welded to the sides of said disk and around said sharpened edge.

6. A combined metal and glass structure comprising an annular sheet metal disk and a glass tube welded directly to the side of said disk at one of the circular edges thereof.

7. A tubular member comprising two glass sections and an intermediate metal section comprising a disk to the opposite sides of which the two glass sections are welded.

8. A tubular member comprising two glass sections having different coefficients of expansion, and an intermediate metal section comprising a disk to the opposite sides of which the glass sections are welded.

9. A tubular member comprising two glass sections and an intermediate annular section, to the opposite sides of which, adjacent to its periphery, the glass sections are welded.

10. In combination a tubular glass member, a metal disk having a sharpened edge portion welded to said glass member, and a conductor extending from said disk.

11. In combination a tubular glass member, a metal disk having its edge welded into said tubular member, and a leading-in conductor carried by said disk.

12. The method of uniting two glass sections having different coefficients of expansion which consists in welding said glass sections to the opposite sides of an intermediate metal section.

13. The method of uniting two glass sections having different coefficients of expansion, which consists in simultaneously welding said glass sections to the opposite sides of an intermediate metal disk.

In witness whereof, I hereunto subscribe my name this 29th day of December A. D. 1917.

WILLIAM G. HOUSKEEPER.